US010838092B2

(12) United States Patent
Ayeni et al.

(10) Patent No.: US 10,838,092 B2
(45) Date of Patent: Nov. 17, 2020

(54) ESTIMATING MULTIPLE SUBSURFACE PARAMETERS BY CASCADED INVERSION OF WAVEFIELD COMPONENTS

(71) Applicants: Gboyega Ayeni, Houston, TX (US); Partha S. Routh, Katy, TX (US); John E. Anderson, Spring, TX (US)

(72) Inventors: Gboyega Ayeni, Houston, TX (US); Partha S. Routh, Katy, TX (US); John E. Anderson, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 258 days.

(21) Appl. No.: 14/738,471

(22) Filed: Jun. 12, 2015

(65) Prior Publication Data
US 2017/0010373 A1   Jan. 12, 2017

Related U.S. Application Data

(60) Provisional application No. 62/028,719, filed on Jul. 24, 2014.

(51) Int. Cl.
*G01V 1/00* (2006.01)
*G01V 1/28* (2006.01)

(52) U.S. Cl.
CPC ........ *G01V 1/282* (2013.01); *G01V 2210/624* (2013.01); *G01V 2210/626* (2013.01); *G01V 2210/67* (2013.01)

(58) Field of Classification Search
CPC ............. G01V 1/282; G01V 2210/624; G01V 2210/626; G01V 2210/67

(Continued)

(56) References Cited

U.S. PATENT DOCUMENTS 3,812,457 A   5/1974   Weller
3,864,667 A   2/1975   Bahjat
(Continued)

FOREIGN PATENT DOCUMENTS

CA   2 796 631   11/2011
EP   1 094 338   4/2001
(Continued)

OTHER PUBLICATIONS

Gao, H. et al. (2008), "Implementation of perfectly matched layers in an arbitrary geometrical boundary for leastic wave modeling," *Geophysics J. Int.* 174, pp. 1029-1036.
(Continued)

*Primary Examiner* — Michael P Nghiem
(74) *Attorney, Agent, or Firm* — ExxonMobil Upstream Research Company—Law Department

(57) ABSTRACT

A method, including: obtaining initial estimates of a plurality of subsurface parameters; obtaining a recorded wavefield decomposed into a plurality of discrete components; performing, with a computer, a cascaded inversion where the initial estimates of the subsurface parameters are individually updated, wherein each of the subsurface parameters are updated using a different discrete component of the recorded wavefield of the plurality of discrete components; and generating, with the computer, updated subsurface models from the cascaded inversion for each of the subsurface parameters.

8 Claims, 6 Drawing Sheets

(58) Field of Classification Search
USPC .......................................................... 702/14
See application file for complete search history.

(56) References Cited

U.S. PATENT DOCUMENTS

| | | | |
|---|---|---|---|
| 4,159,463 A | 6/1979 | Silverman | |
| 4,168,485 A | 9/1979 | Payton et al. | |
| 4,545,039 A | 10/1985 | Savit | |
| 4,562,650 A | 1/1986 | Nagasawa et al. | |
| 4,575,830 A | 3/1986 | Ingram et al. | |
| 4,594,662 A | 6/1986 | Devaney | |
| 4,636,957 A | 1/1987 | Vannier et al. | |
| 4,675,851 A | 6/1987 | Savit et al. | |
| 4,686,654 A | 8/1987 | Savit | |
| 4,707,812 A | 11/1987 | Martinez | |
| 4,715,020 A | 12/1987 | Landrum, Jr. | |
| 4,766,574 A | 8/1988 | Whitmore et al. | |
| 4,780,856 A | 10/1988 | Becquey | |
| 4,823,326 A | 4/1989 | Ward | |
| 4,924,390 A | 5/1990 | Parsons et al. | |
| 4,953,657 A | 9/1990 | Edington | |
| 4,969,129 A | 11/1990 | Currie | |
| 4,982,374 A | 1/1991 | Edington et al. | |
| 5,260,911 A | 11/1993 | Mason et al. | |
| 5,469,062 A | 11/1995 | Meyer, Jr. | |
| 5,583,825 A | 12/1996 | Carrazzone et al. | |
| 5,677,893 A | 10/1997 | de Hoop et al. | |
| 5,715,213 A | 2/1998 | Allen | |
| 5,717,655 A | 2/1998 | Beasley | |
| 5,719,821 A | 2/1998 | Sallas et al. | |
| 5,721,710 A | 2/1998 | Sallas et al. | |
| 5,790,473 A | 8/1998 | Allen | |
| 5,798,982 A | 8/1998 | He et al. | |
| 5,822,269 A | 10/1998 | Allen | |
| 5,838,634 A | 11/1998 | Jones et al. | |
| 5,852,588 A | 12/1998 | de Hoop et al. | |
| 5,878,372 A | 3/1999 | Tabarovsky et al. | |
| 5,920,838 A | 7/1999 | Norris et al. | |
| 5,924,049 A | 7/1999 | Beasley et al. | |
| 5,999,488 A | 12/1999 | Smith | |
| 5,999,489 A | 12/1999 | Lazaratos | |
| 6,014,342 A | 1/2000 | Lazaratos | |
| 6,021,094 A | 2/2000 | Ober et al. | |
| 6,028,818 A | 2/2000 | Jeffryes | |
| 6,058,073 A | 5/2000 | VerWest | |
| 6,125,330 A | 9/2000 | Robertson et al. | |
| 6,219,621 B1 | 4/2001 | Hornbostel | |
| 6,225,803 B1 | 5/2001 | Chen | |
| 6,311,133 B1 | 10/2001 | Lailly et al. | |
| 6,317,695 B1 | 11/2001 | Zhou et al. | |
| 6,327,537 B1 | 12/2001 | Ikelle | |
| 6,374,201 B1 | 4/2002 | Grizon et al. | |
| 6,381,543 B1 | 4/2002 | Guerillot et al. | |
| 6,388,947 B1 | 5/2002 | Washbourne et al. | |
| 6,480,790 B1 | 11/2002 | Calvert et al. | |
| 6,522,973 B1 | 2/2003 | Tonellot et al. | |
| 6,545,944 B2 | 4/2003 | de Kok | |
| 6,549,854 B1 | 4/2003 | Malinverno et al. | |
| 6,574,564 B2 | 6/2003 | Lailly et al. | |
| 6,593,746 B2 | 7/2003 | Stolarczyk | |
| 6,662,147 B1 | 12/2003 | Fournier et al. | |
| 6,665,615 B2 | 12/2003 | Van Riel et al. | |
| 6,687,619 B2 | 2/2004 | Moerig et al. | |
| 6,687,659 B1 | 2/2004 | Shen | |
| 6,704,245 B2 | 3/2004 | Becquey | |
| 6,714,867 B2 | 3/2004 | Meunier | |
| 6,735,527 B1 | 5/2004 | Levin | |
| 6,754,590 B1 | 6/2004 | Moldoveanu | |
| 6,766,256 B2 | 7/2004 | Jeffryes | |
| 6,826,486 B1 | 11/2004 | Malinverno | |
| 6,836,448 B2 | 12/2004 | Robertsson et al. | |
| 6,842,701 B2 | 1/2005 | Moerig et al. | |
| 6,859,734 B2 | 2/2005 | Bednar | |
| 6,865,487 B2 | 3/2005 | Charron | |
| 6,865,488 B2 | 3/2005 | Moerig et al. | |
| 6,876,928 B2 | 4/2005 | Van Riel et al. | |
| 6,882,938 B2 | 4/2005 | Vaage et al. | |
| 6,882,958 B2 | 4/2005 | Schmidt et al. | |
| 6,901,333 B2 | 5/2005 | Van Riel et al. | |
| 6,903,999 B2 | 6/2005 | Curtis et al. | |
| 6,905,916 B2 | 6/2005 | Bartsch et al. | |
| 6,906,981 B2 | 6/2005 | Vauge | |
| 6,927,698 B2 | 8/2005 | Stolarczyk | |
| 6,944,546 B2 | 9/2005 | Xiao et al. | |
| 6,947,843 B2 | 9/2005 | Fisher et al. | |
| 6,970,397 B2 | 11/2005 | Castagna et al. | |
| 6,977,866 B2 | 12/2005 | Huffman et al. | |
| 6,999,880 B2 | 2/2006 | Lee | |
| 7,046,581 B2 | 5/2006 | Calvert | |
| 7,050,356 B2 | 5/2006 | Jeffryes | |
| 7,069,149 B2 | 6/2006 | Goff et al. | |
| 7,027,927 B2 | 7/2006 | Routh et al. | |
| 7,072,767 B2 | 7/2006 | Routh et al. | |
| 7,092,823 B2 | 8/2006 | Lailly et al. | |
| 7,110,900 B2 | 9/2006 | Adler et al. | |
| 7,184,367 B2 | 2/2007 | Yin | |
| 7,230,879 B2 | 6/2007 | Herkenoff et al. | |
| 7,271,747 B2 | 9/2007 | Baraniuk et al. | |
| 7,330,799 B2 | 2/2008 | Lefebvre et al. | |
| 7,337,069 B2 | 2/2008 | Masson et al. | |
| 7,373,251 B2 | 5/2008 | Hamman et al. | |
| 7,373,252 B2 | 5/2008 | Sherrill et al. | |
| 7,376,046 B2 | 5/2008 | Jeffryes | |
| 7,376,539 B2 | 5/2008 | Lecomte | |
| 7,400,978 B2 | 7/2008 | Langlais et al. | |
| 7,436,734 B2 | 10/2008 | Krohn | |
| 7,480,206 B2 | 1/2009 | Hill | |
| 7,584,056 B2 | 9/2009 | Koren | |
| 7,599,798 B2 | 10/2009 | Beasley et al. | |
| 7,602,670 B2 | 10/2009 | Jeffryes | |
| 7,616,523 B1 | 11/2009 | Tabti et al. | |
| 7,620,534 B2 | 11/2009 | Pita et al. | |
| 7,620,536 B2 | 11/2009 | Chow | |
| 7,646,924 B2 | 1/2010 | Donoho | |
| 7,672,194 B2 | 3/2010 | Jeffryes | |
| 7,672,824 B2 | 3/2010 | Dutta et al. | |
| 7,675,815 B2 | 3/2010 | Saenger et al. | |
| 7,679,990 B2 | 3/2010 | Herkenhoff et al. | |
| 7,684,281 B2 | 3/2010 | Vaage et al. | |
| 7,710,821 B2 | 5/2010 | Robertsson et al. | |
| 7,715,985 B2 | 5/2010 | Van Manen et al. | |
| 7,715,986 B2 | 5/2010 | Nemeth et al. | |
| 7,725,266 B2 | 5/2010 | Sirgue et al. | |
| 7,791,980 B2 | 9/2010 | Robertsson et al. | |
| 7,835,072 B2 | 11/2010 | Izumi | |
| 7,840,625 B2 | 11/2010 | Candes et al. | |
| 7,940,601 B2 | 5/2011 | Ghosh | |
| 8,121,823 B2 | 2/2012 | Krebs et al. | |
| 8,248,886 B2 | 8/2012 | Neelamani et al. | |
| 8,428,925 B2 | 4/2013 | Krebs et al. | |
| 8,437,998 B2 | 5/2013 | Routh et al. | |
| 8,547,794 B2 | 10/2013 | Gulati et al. | |
| 8,688,381 B2 | 4/2014 | Routh et al. | |
| 8,781,748 B2 | 7/2014 | Laddoch et al. | |
| 9,702,998 B2* | 7/2017 | Bansal | G01V 1/303 |
| 2002/0099504 A1 | 7/2002 | Cross et al. | |
| 2002/0120429 A1 | 8/2002 | Ortoleva | |
| 2002/0183980 A1 | 12/2002 | Guillaume | |
| 2004/0199330 A1 | 10/2004 | Routh et al. | |
| 2004/0225438 A1 | 11/2004 | Okoniewski et al. | |
| 2006/0235666 A1 | 10/2006 | Assa et al. | |
| 2007/0036030 A1 | 2/2007 | Baumel et al. | |
| 2007/0038691 A1 | 2/2007 | Candes et al. | |
| 2007/0274155 A1 | 11/2007 | Ikelle | |
| 2008/0015782 A1* | 1/2008 | Saltzer | G01V 1/306 702/12 |
| 2008/0175101 A1 | 7/2008 | Saenger et al. | |
| 2008/0306692 A1 | 12/2008 | Singer et al. | |
| 2009/0006054 A1 | 1/2009 | Song | |
| 2009/0067041 A1 | 3/2009 | Krauklis et al. | |
| 2009/0070042 A1 | 3/2009 | Birchwood et al. | |
| 2009/0083006 A1 | 3/2009 | Mackie | |
| 2009/0164186 A1 | 6/2009 | Haase et al. | |
| 2009/0164756 A1 | 6/2009 | Dokken et al. | |

(56) References Cited

U.S. PATENT DOCUMENTS

| | | |
|---|---|---|
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0176820 A1* | 7/2013 | Le Meur ................ G01V 1/366 367/38 |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1* | 11/2014 | Wang ..................... G01V 1/28 702/14 |
| 2014/0358504 A1 | 12/2014 | Baumstein et al. |
| 2014/0372043 A1 | 12/2014 | Hu et al. |
| 2015/0012221 A1* | 1/2015 | Bansal ................ G01V 1/303 702/18 |
| 2015/0057938 A1* | 2/2015 | Krohn ................. G01V 1/247 702/18 |
| 2015/0073755 A1* | 3/2015 | Tang ................. G06F 17/5009 703/2 |
| 2016/0097870 A1* | 4/2016 | Routh ................. G01V 1/003 703/2 |
| 2018/0017690 A1* | 1/2018 | Tan ..................... G01V 1/303 |
| 2018/0275300 A1* | 9/2018 | Akcelik ............... G01V 1/282 |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Gibson, B. et al. (1984), "Predictive deconvolution and the zero-phase source," *Geophysics* 49(4), pp. 379-397.

Godfrey, R. J. et al. (1998), "Imaging the Foiaven Ghost," *SEG Expanded Abstracts*, 4 pgs.

Griewank, A. (1992), "Achieving logarithmic growth of temporal and spatial complexity in reverse automatic differentiation," *J. Optimization Methods and Software*, pp. 35-54.

Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Haber, E. et al. (2010), "An effective method for parameter estimation with PDE constraints with multiple right hand sides," Preprint—UBC http://www.math.ubc.ca/~haber/pubs/PdeOptStochV5.pdf.

Hampson, D.P. et al. (2005), "Simultaneous inversion of pre-stack seismic data," SEG 75th Annual Int'l. Meeting, *Expanded Abstracts*, pp. 1633-1637.

Heinkenschloss, M. (2008), :"Numerical Solution of Implicity Constrained Optimization Problems," CAAM Technical Report TR08-05, 25 pgs.

Helbig, K. (1994), "Foundations of Anisotropy for Exploration Seismics," Chapter 5, pp. 185-194.

Herrmann, F.J. (2010), "Randomized dimensionality reduction for full-waveform inversion," *EAGE abstract* G001, EAGE Barcelona meeting, 5 pgs.

Holschneider, J. et al. (2005), "Characterization of dispersive surface waves using continuous wavelet transfolins," *Geophys. J. Int.* 163, pp. 463-478.

Hu, L.Z. et al. (1987), "Wave-field transformations of vertical seismic profiles," *Geophysics* 52, pp. 307-321.

Huang, Y. et al. (2012), "Multisource least-squares migration of marine streamer and land data with frequency-division encoding," *Geophysical Prospecting* 60, pp. 663-680.

(56) References Cited

OTHER PUBLICATIONS

Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and 70th Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," *70th SEG Ann. Meeting, Expanded Abstracts*, pp. 1572-1575.
Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," *The Leading Edge*, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007), "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," Geophysics, 74(2):doi:10.1190/1.3074303, pp. Q1-Q16.

Moghaddam, P.P. et al. (2010), "Randomized full-wavefoim inversion: a dimenstionality-reduction approach," $80^{th}$ SEG Ann. Meeting, Expanded Abstracts, pp. 977-982.
Mora, P. (1987), "Nonlinear two-dimensional elastic inversion of multi-offset seismic data," *Geophysics* 52, pp. 1211-1228.
Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Tarantola, A. (1984), "Inversion of seismic reflection data in the acoustic approximation," *Geophysics* 49, pp. 1259-1266.
Trantham, E.C. (1994), "Controlled-phase acquisition and processing," *SEG Expanded Abstracts* 13, pp. 890-894.
Tsvankin, I. (2001), "Seismic Signatures and Analysis of Reflection Data in Anisotropic Media," Elsevier Science, p. 8.
Valenciano, A.A. (2008), "Imaging by Wave-Equation Inversion," A Dissertation, Stanford University, 138 pgs.
van Groenestijn, G.J.A. et al. (2009), "Estimating primaries by sparse inversion and application to near-offset reconstruction," *Geophyhsics* 74(3), pp. A23-A28.
van Manen, D.J. (2005), "Making wave by time reversal," SEG International Exposition and $75^{th}$ Annual Meeting, *Expanded Abstracts*, pp. 1763-1766.
Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. (1989), "Wavelet Estimation by Prestack Multiple Elimination," *SEG Expanded Abstracts* 8, pp. 1129-1132.
Versteeg, R. (1994), "The Marmousi experience: Velocity model determination on a synthetic complex data set," *The Leading Edge*, pp. 927-936.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," Geophysics 72(2), pp. V33-V39.
Wang, K. et al. (2009), "Simultaneous full-wavefoim inversion for source wavelet and earth model," SEG Int'l. Expo. & Ann. Meeting, Expanded Abstracts, pp. 2537-2541.
Weglein, A.B. (2003), "Inverse scattering series and seismic exploration," *Inverse Problems* 19, pp. R27-R83.
Wong, M. et al. (2010), "Joint least-squares inversion of up- and down-going signal for ocean bottom data sets," *SEG Expanded Abstracts* 29, pp. 2752-2756.
Wu R-S. et al. (2006), "Directional illumination analysis using beamlet decomposition and propagation," *Geophysics* 71(4), pp. S147-S159.
Xia, J. et al. (2004), "Utilization of high-frequency Rayleigh waves in near-surface geophysics," *The Leading Edge*, pp. 753-759.
Xie, X. et al. (2002), "Extracting angle domain infoimation from migrated wavefield," *SEG Expanded Abstracts*21, pp. 1360-1363.
Xie, X.-B. et al. (2006), "Wave-equation-based seismic illumination analysis," *Geophysics* 71(5), pp. S169-S177.
Yang, K. et al. (2000), "Quasi-Orthogonal Sequences for Code-Division Multiple-Access Systems," *IEEE Transactions on Information Theory* 46(3), pp. 982-993.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," *SIAM*, 20 pgs.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.
Abt, D.L. et al. (2010), "North American lithospheric discontinuity structured imaged by Ps and Sp receiver functions", *J. Geophys. Res.*, 24 pgs.

(56) References Cited

OTHER PUBLICATIONS

Akerberg, P., et al. (2008), "Simultaneous source separation by sparse radon transfoim," 78th SEG Annual International Meeting, *Expanded Abstracts*, pp. 2801-2805.

Aki, K. et al. (1980), "Quantitative Seismology: Theory and Methods vol. I—Chapter 7—Surface Waves in a Vertically Heterogenous Medium," W.H. Freeman and Co., pp. 259-318.

Aki, K. et al. (1980), "Quantitative Seismology: Theory and Methods vol. I," W.H. Freeman and Co., p. 173.

Aki et al. (1980), "Quantitative Seismology, Theory and Methods," Chapter 5.20, W.H. Freeman & Co., pp. 133-155.

Amundsen, L. (2001), "Elimination of free-surface related multiples without need of the source wavelet," *Geophysics* 60(1), pp. 327-341.

Anderson, J.E. et al. (2008), "Sources Near the Free-Surface Boundary: Pitfalls for Elastic Finite-Difference Seismic Simulation and Multi-Grid Waveform Inversion," $70^{th}$ EAGE Conf. & Exh., 4 pgs.

Barr, F.J. et al. (1989), "Attenuation of Water-Column Reverberations Using Pressure and Velocity Detectors in a Water-Bottom Cable," $59^{th}$ Annual SEG meeting, *Expanded Abstracts*, pp. 653-656.

Baumstein, A. et al. (2009), "Scaling of the Objective Function Gradient for Full Wavefield Inversion," SEG Houston 2009 Int'l. Expo and Annual Meeting, pp. 224-2247.

Beasley, C. (2008), "A new look at marine simultaneous sources," *The Leading Edge* 27(7), pp. 914-917.

Beasley, C. (2012), "A 3D simultaneous source field test processed using alternating projections: a new active separation method," *Geophsyical Prospecting* 60, pp. 591-601.

Beaty, K.S. et al. (2003), "Repeatability of multimode Rayleigh-wave dispersion studies," *Geophysics* 68(3), pp. 782-790.

Beaty, K.S. et al. (2002), "Simulated annealing inversion of multimode Rayleigh wave dispersion waves for geological structure," *Geophys. J. Int.* 151, pp. 622-631.

Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.

Ben-Hadj-Ali, H. et al. (2011), "An efficient frequency-domain full waveform inversion method using simultaneous encoded sources," *Geophysics* 76(4), pp. R109-R124.

Benitez, D. et al. (2001), "The use of the Hilbert transform in ECG signal analysis," *Computers in Biology and Medicine* 31, pp. 399-406.

Berenger, J-P. (1994), "A Perfectly Matched Layer for the Absorption of Electromagnetic Waves," *J. of Computational Physics* 114, pp. 185-200.

Berkhout, A.J. (1987), "Applied Seismic Wave Theory," Elsevier Science Publishers, p. 142.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Beylkin, G. (1985), "Imaging of discontinuities in the inverse scattring problem by inversion of a causal generalized Radon transfaim," *J. Math. Phys.* 26, pp. 99-108.

Biondi, B. (1992), "Velocity estimation by beam stack," Geophysics 57(8), pp. 1034-1047.

Bonomi, E. et al. (2006), "Wavefield Migration plus Monte Carlo Imaging of 3D Prestack Seismic Data," *Geophysical Prospecting* 54, pp. 505-514.

Boonyasiriwat, C. et al. (2010), 3D Multisource Full-Wavefoiin using Dynamic Random Phase Encoding, SEG Denver 2010 Annual Meeting, pp. 1044-1049.

Boonyasiriwat, C. et al. (2010), 3D Multisource Full-Waveform using Dynamic Random Phase Encoding, SEG Denver 2010 Annual Meeting, pp. 3120-3124.

Burstedde, G. et al. (2009), "Algorithmic strategies for full wavefoiiii inversion: 1D experiments," *Geophysics* 74(6), pp. WCC17-WCC46.

Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," $73^{rd}$ EAGE Conference, *Abstract*, pp. F026.

Choi, Y et al. (2012), "Application of multi-source waveform inversion to marine stream data using the global correlation noun," *Geophysical Prospecting* 60, pp. 748-758.

Clapp, R.G. (2009), "Reverse time migration with random boundaries," SEG International Exposition and Meeting, *Expanded Abstracts*, pp. 2809-2813.

Dai, W. et al. (2010), "3D Multi-source Least-squares Reverse Time Migration," SEG Denver 2010 Annual Meeting, pp. 3120-3124.

Delprat-Jannuad, F. et al. (2005), "A fundamental limitation for the reconstruction of impedance profiles from seismic data," *Geophysics* 70(1), pp. R1-R14.

Dickens, T.A. et al. (2011), RTM angle gathers using Poynting vectors, *SEG Expanded Abstracts* 30, pp. 3109-3113.

Donerici, B. et al. (1005), "Improved FDTD Subgridding Algorithms Via Digital Filtering and Domain Overriding," *IEEE Transactions on Antennas and Propagation* 53(9), pp. 2938-2951.

Downey, N. et al. (2011), "Random-Beam Full-Wavefield Inversion," 2011 San Antonio Annual Meeting, pp. 2423-2427.

Dunkin, J.W. et al. (1973), "Effect of Normal Moveout on a Seismic Pluse," *Geophysics* 38(4), pp. 635-642.

Dziewonski A. et al. (1981), "Preliminary Reference Earth Model", *Phys. Earth Planet. Int.* 25(4), pp. 297-356.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Esmersoy, C. (1990), "Inversion of P and SV waves from multicomponent offset vertical seismic profiles", *Geophysics* 55(1), pp. 39-50.

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

U.S. Appl. No. 14/329,431, filed Jul. 11, 2014, Krohn et al.

U.S. Appl. No. 14/330,767, filed Jul. 14, 2014, Tang et al.

Bunks, C. et al. (1995), "Multiscale seismic waveform inversion," *Geophysics* 60, pp. 1457-1473.

Prieux, V. et al. (2009), "Application of acoustic full waveform inversion to the synthetic Valhall velocity model," *SEG Expanded Abstracts*, pp. 2268-2272.

Prieux, V. et al. (2011), "On the footprint of anisotropy on isotropic full waveform inversion: The Valhall case study," *Geophysical Journal Int'l.* 187, pp. 1495-1515.

Sirgue, L. et al. (2004), "Efficient waveform inversion and imaging: A strategy for selecting temporal frequencies," *Geophysics* 69, pp. 231-248.

Warner, M. et al. (2013), "Anisotropic 3D full-waveform inversion," *Geophysics* 78(2), pp. R59-R80.

Mora, P. (1987), "Elastic Wavefield Inversion," PhD Thesis, Stanford University, pp. 22-25.

Mora, P. (1989), "Inversion = migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

(56) References Cited

OTHER PUBLICATIONS

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization*," Springer, New York, 2nd Edition, pp. 165-176.

Ostmo, S. et al. (2002), "Finite-difference iterative migration by linearized waveform inversion in the frequency domain," SEG Int'l. Expo. & 72$^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor. Prowess in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ronen S. et al. (2005), "Imaging Downgoing waves from Ocean Bottom Stations," *SEG Expanded Abstracts*, pp. 963-967.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

Ryden, N. et al. (2006), "Fast simulated annealing inversion of surface waves on pavement using phase-velocity spectra," *Geophysics* 71(4), pp. R49-R58.

Sambridge, M.S. et al. (1991), "An Alternative Strategy for Non-Linear Inversion of Seismic Waveforms," *Geophysical Prospecting* 39, pp. 723-736.

Schoenberg, M. et al. (1989), "A calculus for finely layered anisotropic media," *Geophysics* 54, pp. 581-589.

Schuster, G.T. et al. (2010), "Theory of Multisource Crosstalk Reduction by Phase-Encoded Statics," SEG Denver 2010 Ann. Meeting, pp. 3110-3114.

Sears, T.J. et al. (2008), "Elastic full waveform inversion of multi-component OBC seismic data," *Geophysical Prospecting* 56, pp. 843-862.

Sheen, D-H. et al. (2006), "Time domain Gauss-Newton seismic waveform inversion in elastic media," Geophysics J. Int. 167, pp. 1373-1384.

Shen, P. et al. (2003), "Differential semblance velocity analysis by wave-equation migration," 73$^{rd}$ Ann. Meeting of Society of Exploration Geophysicists, 4 pgs.

Sheng, J. et al. (2006), "Early arrival waveform tomography on near-surface refraction data," *Geophysics* 71, pp. U47-U57.

Sheriff, R.E.et al. (1982), "*Exploration Seismology*", pp. 134-135.

Shih, R-C. et al. (1996), "Iterative pre-stack depth migration with velocity analysis," *Terrestrial, Atmospheric & Oceanic Sciences* 7(2), pp. 149-158.

Shin, C. et al. (2001), "Waveform inversion using a logarithmic wavefield," *Geophysics* 49, pp. 592-606.

Simard, P.Y. et al. (1990), "Vector Field Restoration by the Method of Convex Projections," *Computer Vision, Graphics and Image Processing* 52, pp. 360-385.

Soubaras, R. et al. (2007), "Velocity model building by semblance maximization of modulated-shot gathers," *Geophysics* 72(5), pp. U67-U73.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. And Exh., *EAGE Extended Abstracts*, 5 pgs.

Symes, W.W. (2007), "Reverse time migration with optimal checkpointing," *Geophysics* 72(5), pp. P.SM213-SM221.

Symes, W.W. (2009), "Interface error analysis for numerical wave propagation," *Compu. Geosci.* 13, pp. 363-371.

Tang, Y. (2008), "Wave-equation Hessian by phase encoding," *SEG Expanded Abstracts* 27, pp. 2201-2205.

Tang, Y. (2009), "Target-oriented wave-equation least-squares migration/inversion with phase-encoded Hessian," *Geophysics* 74, pp. WCA95-WCA107.

Tang, Y. et al. (2010), "Preconditioning full waveform inversion with phase-encoded Hessian," *SEG Expanded Abstracts* 29, pp. 1034-1037.

Nocedal, J. et al. (2000), "*Numerical Optimization-Chapter 8: Calculating Derivatives*" Springer Verlag, 11 pages.

\* cited by examiner

ESTIMATING MULTIPLE SUBSURFACE PARAMETERS BY CASCADED INVERSION OF WAVEFIELD COMPONENTS

This application claims the benefit of U.S. Provisional Patent Application 62/028,719, filed Jul. 24, 2014, entitled ESTIMATING MULTIPLE SUBSURFACE PARAMETERS BY CASCADED INVERSION OF WAVEFIELD COMPONENTS, the entirety of which is incorporated by reference herein.

TECHNOLOGICAL FIELD

Exemplary embodiments described herein pertain to geophysical prospecting and, more particularly, to seismic data processing that includes estimating multiple subsurface parameters by cascaded inversion of wavefield components.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Geophysical inversion attempts to find a model of subsurface properties that optimally explains observed data and satisfies geological and geophysical constraints. There are a large number of well known methods of geophysical inversion. These well known methods fall into one of two categories, iterative inversion and non-iterative inversion. The following are definitions of what is commonly meant by each of the two categories.

Non-iterative inversion—inversion that is accomplished by assuming some simple background model and updating the model based on the input data. This method does not use the updated model as input to another step of inversion. For the case of seismic data these methods are commonly referred to as imaging, migration, diffraction tomography or Born inversion.

Iterative inversion—inversion involving repetitious improvement of the subsurface properties model such that a model is found that satisfactorily explains the observed data. If the inversion converges, then the final model will better explain the observed data and will more closely approximate the actual subsurface properties. Iterative inversion usually produces a more accurate model than non-iterative inversion, but is much more expensive to compute Multi-parameter full wavefield inversion (FWI) formulates the seismic inversion problem as one of simultaneous estimation of more than one subsurface parameter from recorded seismic wavefields. Depending on the level of approximation to the full wave-equation, it is possible to define multi-parameter FWI such that one derives estimates of attenuation, elastic, anisotropic or other parameters of interest. However, in many practical scenarios, it is difficult to directly invert the recorded seismic wavefield for all desirable parameters at one time.

For example, in the context of anisotropy estimation, because of the strong dependencies between physical parameters (e.g. vertical velocity or normal moveout velocity) and anisotropic (e.g. Thomsen's $\epsilon$ and $\delta$) parameters, and because of the poor sensitivities of anisotropic parameters to changes in parts of the seismic wavefield, reliable anisotropy estimation from FWI has been elusive. Where strong anisotropy exists, assumption of isotropy is inadequate to fully explain all of the recorded seismic wavefield.

In current production-scale FWI applications, anisotropic parameters—derived outside the FWI framework—are usually assumed fixed and sufficiently accurate to provide FWI subsurface models that are adequate both for imaging and for reservoir characterization (e.g., Warner et al., 2013). This fixed-anisotropy assumption clearly fails where the original (fixed) anisotropic parameters are themselves inaccurate and may lead to significant errors in estimated physical subsurface parameters. In addition, updates in the earth's physical parameters through FWI require corresponding updates in anisotropic parameters.

Full implementation of multi-parameter inversion requires second-order (Hessian) information in order to correctly scale different parameters to be inverted and also in order to attenuate crosstalk artifacts resulting from strong dependences between the parameters. For practical purposes, getting such second order information is too expensive, necessitating strong approximations of the Hessian. Such approximations degrade the importance and effectiveness of the retrieved second-order information in accurate simultaneous estimation of of multiple parameters. Furthermore, even where such Hessian information can be cheaply retrieved, solving the resulting equations is expensive and susceptible to several pitfalls.

Finally, alternating estimation of individual parameters from the recorded wavefield using different engines (e.g. ray-based methods for anisotropic parameters and FWI for physical parameters) will suffer from inconsistent Earth model parameters. Similar observations can be made in in multi-parameter inversion for elastic, attenuation and other parameters.

SUMMARY

A method, including: obtaining initial estimates of a plurality of subsurface parameters; obtaining a recorded wavefield decomposed into a plurality of discrete components; performing, with a computer, a cascaded inversion where the initial estimates of the subsurface parameters are individually updated, wherein each of the subsurface parameters are updated using a different discrete component of the recorded wavefield of the plurality of discrete components; and generating, with the computer, updated subsurface models from the cascaded inversion for each of the subsurface parameters.

The method can further include: establishing a correspondence between each of the subsurface parameters and a different one of the discrete components of the recorded wavefield, wherein the performing the cascaded inversion includes, iteratively updating the initial estimates of the plurality of subsurface parameters, wherein each of the plurality of subsurface parameters is updated individually based on the corresponding discrete component of the recorded wavefield, and wherein for each iteration of the updating, the discrete components of the recorded wavefield are expanded to include more of the recorded wavefield.

In the method, each of the plurality of subsurface parameters can be updated by performing a sub-iterative inversion process.

In the method, the sub-iterative inversion process can include: individually performing a predetermined number of mono-parameter full wavefield inversion updates for each of the subsurface parameters.

In the method, the mono-parameter full wavefield inversion updates for each of the subsurface parameters can be performed in series, and the method can further include providing an output of an earlier mono-parameter full wavefield inversion update for a subsurface parameter as an input to a subsequent mono-parameter full wavefield inversion update for another subsurface parameter.

The method can further include: repeating the updating until a predetermined level of convergence between observed data and synthetic data generated using the updated subsurface parameters is achieved.

In the method, the updating can be iteratively repeated until the discrete components are each expanded to include an entirety of the recorded wavefield.

In the method, the establishing can include basing the correspondence on sensitivity of each of the subsurface parameters to each of the discrete components of the recorded wavefield.

In the method, the subsurface parameters can include both anisotropic parameters and physical subsurface parameters.

The method can further include: iteratively performing cascaded inversion until a global convergence is obtained.

The method can further include: managing hydrocarbons based on the updated subsurface models.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Exemplary embodiments are described herein. However, to the extent that the following description is specific to a particular, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement described herein relates to a practical solution to multi-parameter full wavefield inversion (FWI). For example, the method depicted in FIG. 1 reformats multi-parameter FWI into a cascaded inversion of systematically selected wavefield components. As explained in more detail below, the inverted parameters can be readily constrained to parts of the recorded wavefield to which they are most sensitive while ensuring consistent data-fit of the full recorded wavefield.

Figure 1:
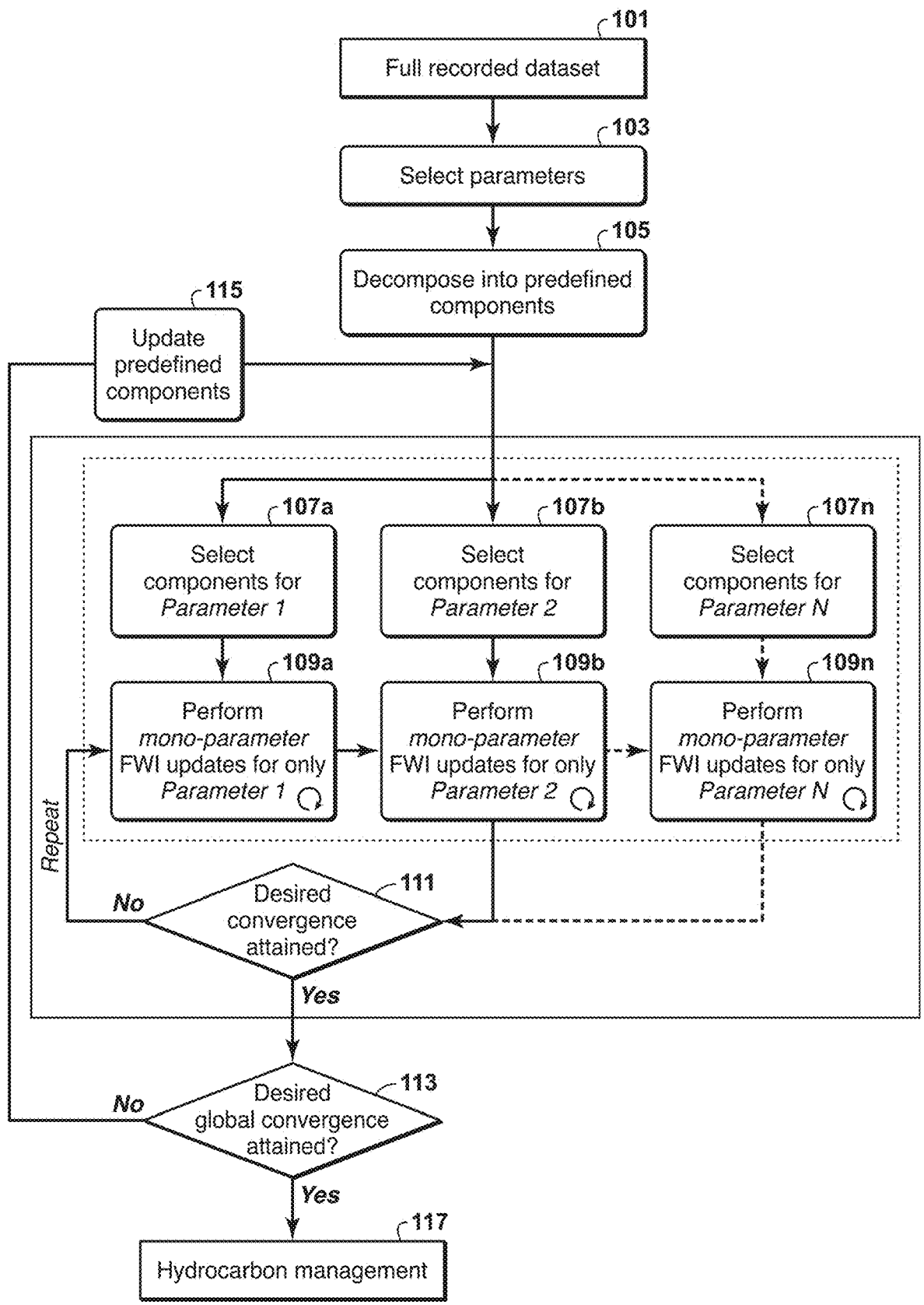
FIG. 1 is a non-limiting example of a method for multi-parameter estimation via cascaded inversion of wavefield components.

FIG. 1 is a non-limiting example of a method for multi-parameter estimation via cascaded inversion of wavefield components. The non-limiting examples provided herein pertain to anisotropic inversion. However, the present technological advancement can be applied to estimate any number of subsurface parameters. As used herein, subsurface parameter includes geophysical properties such as p-wave velocity, shear wave velocity, vertical velocity, normal moveout velocity, anisotropic parameters, attenuation parameters, porosity, permeability, and resistivity. This is not an exhaustive list of parameters useable with the present technological advancement.

As described above, in production-scale applications, one way to account for anisotropy in FWI is by utilizing anisotropic models derived from other methods (e.g. travel-time tomography) for FWI forward simulations while keeping such models fixed throughout the FWI workflow. Here, distinctions are made between physical subsurface parameters (e.g., velocity or impedance) and anisotropic parameters (e.g., Thomsen parameters). If the anisotropic parameters derived outside the FWI engine are sufficiently accurate, it is possible to obtain physical subsurface models which are within acceptable levels of accuracy (e.g., Warner et al., 2013). However, where such anisotropic parameters are inaccurate or anisotropy is neglected, the estimated physical parameters are strongly degraded (e.g. Prieux et al., 2011). To overcome this, some authors have proposed ad-hoc methods that utilize a different engine (such as ray-based tomography) to update anisotropic parameters using FWI physical models and then repeating FWI for re-estimation of the physical parameters while keeping the updated anisotropic parameters fixed. Such alternating approach (for physical parameters through FWI and for anisotropic parameters through a different engine) may provide improvements over the conventional fixed-anisotropy approach. However, because of the disjoint between the estimation engines, it is difficult to simultaneously retrieve consistent anisotropic and physical parameters that simultaneously predict the full seismic wavefield.

By posing anisotropy estimation as an integral part of the FWI formulation in the present technological advancement, reliable and consistent estimates can be obtained of both anisotropic and physical models simultaneously. Utilizing known characteristics of the seismic wavefield, along with sensitivity to changes in various physical parameters, allows multi-parameter anisotropic FWI to be reformatted into coupled cascades of mono-parameter FWI updates. By doing this, the high cost associated with full multi-parameter inversion, which requires reliable second-order (Hessian) information, can be avoided without sacrificing consistency or robustness between the estimated subsurface parameters.

In step 101, a full recorded data set is obtained. The data set can be obtained by either the generation of the data using a source and receivers as is well known in the art, or by operations by a computer to select, access, download, or receive the electronic data set.

In step 103, the parameters of interest are obtained. This can include the determination of discriminating properties of parameters of interest and the components of the full recorded data to which such parameters are most sensitive.

In this anisotropic inversion example, the parameters could be any two or more of vertical velocity $V_z$, normal moveout velocity $V_{NMO}$, the Thomsen parameters $\varepsilon$ and/or $\delta$, $\eta$, and horizontal velocity $V_H$. For the present example, the parameters under consideration are $V_{NMO}$ and $\eta$.

"Normal moveout" or "NMO" is the effect of the separation between receiver and source on the arrival time of a reflection that does not dip, abbreviated NMO. A reflection typically arrives first at the receiver nearest the source. The offset between the source and other receivers induces a delay in the arrival time of a reflection from a horizontal surface at depth. A plot of arrival times versus offset has a hyperbolic shape. $V_{NMO}$ can be determined from the following equation:

$$t = \sqrt{t_o^2 + \frac{x^2}{V_{NMO}^2}} \quad (1)$$

wherein t is the time that the receiver at offset x receives a reflected signal, and $t_o$ is the time for a receiver at zero offset to receive a reflected signal.

$\eta$ is an anellipicity coefficient that is defined as follows:

$$\eta = \frac{1}{2}\left[\left(\frac{V_H}{V_{NMO}}\right)^{-1} - 1\right] \quad (2)$$

Figure 2:
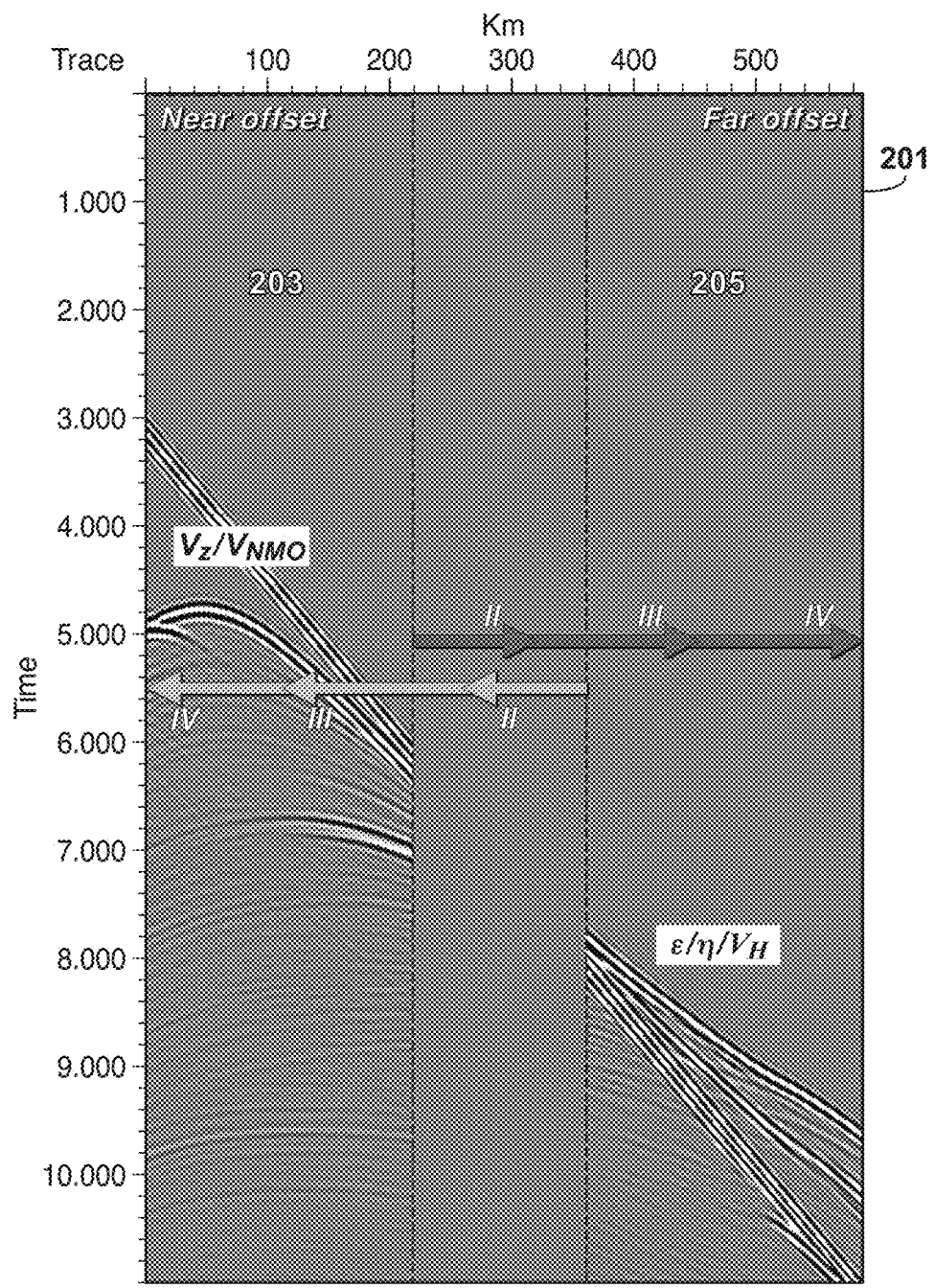
FIG. 2 is a non-limiting example of an application of the present technological advancement to anisotropic acoustic full wavefield inversion.

In step 105, the full recorded data set is decomposed into predefined components. FIG. 2 provides a non-limiting example of the data set decomposition. In FIG. 2, the recorded wavefield 201 is decomposed into discrete offset ranges 203 and 205 labeled "near offset" and "far offset," respectively, and are defined by the vertical dashed lines. Offset is the horizontal distance from the source-position (or from the center of a source group) to a seismic detector, or more commonly to the center of a detector group measured in the horizontal (x-y) plane.

The near offset region 203 and far offset region 205 intentionally do not encompass the full recorded wavefield 201. As explained below, the near offset region 203 and the far offset region 205 will expand for subsequent cascades, and can eventually encompass the entire full recorded wavefield 201. Those of ordinary skill in the art will be able to determine the initial sizes of the near offset region 203 and far offset region 205 based on the particular parameterization being employed, the size of the data set, and the depth of penetration.

Far offset and near offset are examples that are useful in anisotropic inversion. The full recorded data set could be decomposed differently, depending upon the particular application.

In step 107a, component(s) of the recorded wavefield 201 are selected for parameter 1. This can include defining selection criteria for components of the recorded wavefield 201 to utilize for each parameter of interest.

In the present example, parameter 1 is $V_{NMO}$ and the corresponding component of the recorded wavefield is the near offset region 203. The present technological advancement can use contributions from the corresponding components of the recorded wavefield to which a parameter is most sensitive (i.e., $V_{NMO}$ is more sensitive to the near offset than the far offset, or small- to mid-reflection angles). By definition, $V_{NMO}$ provides information about the normal-moveout characteristics of the recorded seismic wavefield 201 at short- to mid-offset ranges.

In step 107b, corresponding component(s) of the recorded wavefield 201 are selected for parameter 2. In the present example, parameter 2 is $\eta$ and the corresponding component of the recorded wavefield is the far offset region 205. $\eta$ is more sensitive to the far offset (or wide reflection angles) than the near offset. By definition, $\eta$ provides information about the non-hyperbolic characteristics of the recorded seismic wavefield 201.

In step 107n, component(s) could be selected for a nth parameter in a manner similar to what was described in steps 107a and 107b.

In step 109a, iterative mono-parameter FWI updates are performed for parameter 1 ($V_{NMO}$). The FWI updates can be accomplished through an iterative cost function optimization (the iterative nature being indicating the curved arrow in the box labeled 109a). Cost function optimization involves iterative minimization of the value, with respect to the model, of a cost function which is a measure of the misfit between the calculated and observed data (this is also sometimes referred to as the objective function), where the calculated data is simulated with a computer using the current geophysical properties model and the physics governing propagation of the source signal in a medium represented by a given geophysical properties model. The simulation computations may be done by any of several numerical methods including but not limited to finite difference, finite element or ray tracing. A geophysical properties model gives one or more subsurface properties as a function of location in a region. Cost functions are well known to those of ordinary skill in the art, and an example of a suitable cost function is discussed in U.S. Pat. No. 8,121,823, the entire content of which is hereby incorporated by reference.

Optionally, within each cascade, the inversions for each parameter can use a frequency continuation technique (e.g., Bunks et. al, 1995; Sirgue and Pratt, 2004; Prieux et. al, 2009). The inversion for each parameter can use different frequency pass bands. For the particular example described here, because typically only the long wavelength background anisotropic model is required, one can utilize lower frequency pass bands for $\eta$ updates and higher frequency pass bands for $V_{NMO}$ updates.

Figure 3:
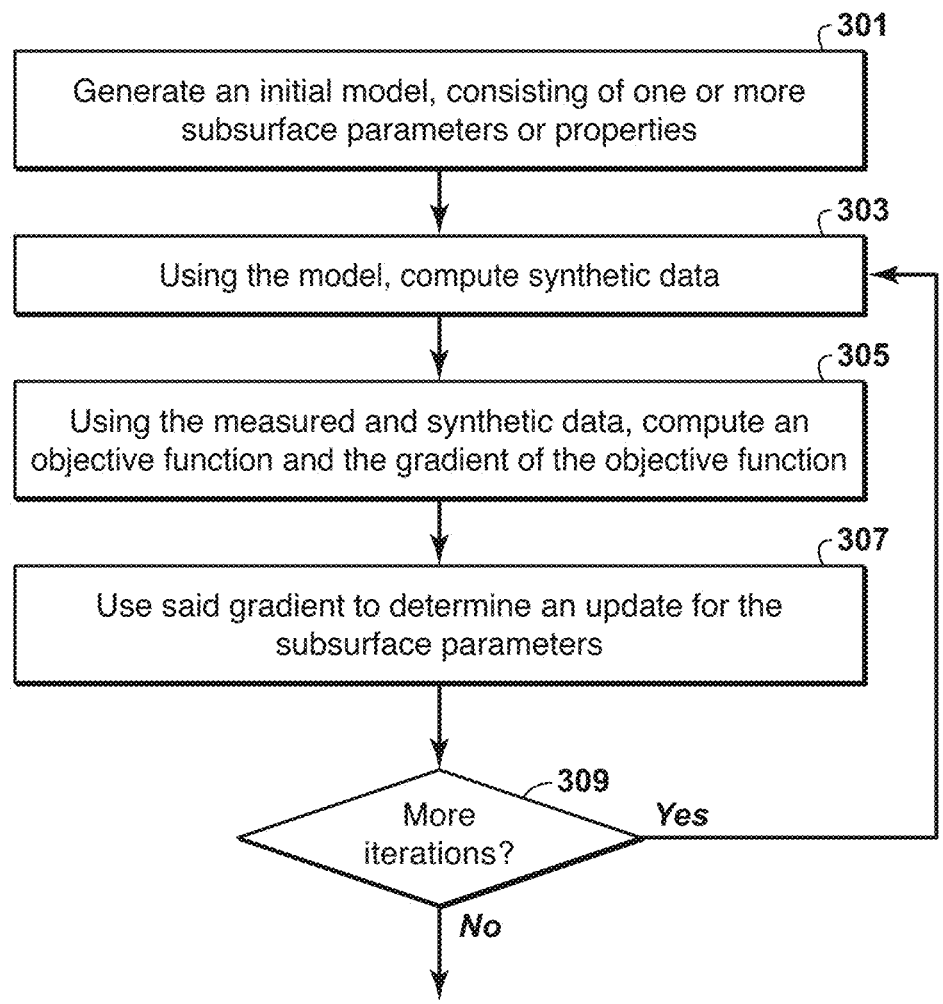
FIG. 3 is a non-limiting example of the inversion of seismic data.

FIG. 3 provides a non-limiting example of iterative cost function optimization. In step 301, an initial geophysical property model for the particular parameter of interest is obtained. Examples of such initial geophysical property models are provide in FIGS. 4A and 4B, and are discussed further below. In step 303, the initial geophysical property model is used to compute synthetic data. Generating and/or obtaining synthetic data based on an initial geophysical property model is well known to those of ordinary skill in the art. In step 305, an objective function is computed using observed geophysical data and corresponding synthetic data obtained in step 303.

As part of step 303, a gradient of the cost function can be taken with respect to only parameter 1 ($V_{NMO}$); other parameters and properties are held constant. Where m is the parameter, f is the cost function, and $\delta$ is the gradient, this calculation can be expressed as follows:

$$\delta m_i = \frac{\partial f}{\partial m_i} \quad (3)$$

In step 307, the gradient (which provides the rate of the change of the cost function in a given direction) is then used to update parameter 1 ($V_{NMO}$) in order to minimize the cost function. Step 307 can include searching for an updated geophysical property model that is a perturbation of the initial geophysical property model in the gradient direction that better explains the observed data.

In step 309, the preceding steps are repeated by using the new updated model as the starting model for another gradient search. The process can continue until an updated model is found which satisfactorily explains the observed data or until a predetermined number of iterations have been completed. Commonly used cost function inversion methods include gradient search, conjugate gradients and Newton's method. However, this is not necessarily an exhaustive list, and the present technological advancement can be used with any cost function inversion method.

Steps 109b to 109n are the same as step 109a, except they are performed for their respective parameters and use the model obtained from the preceding step that was updated for parameter n−1. For example, the model obtained from step 109a, having been updated for only parameter 1, serves as an input for step 109b. At the end of step 109n, a set of updated models, one for each parameter, is generated.

By decomposing the recorded wavefield as discussed above, it can be ensured that initial updates to each inversion parameter are constructed only using parts of the wavefield to which such parameter is most sensitive. The present technological advancement has an advantage that fewer crosstalk artifacts are present in the gradient search direction for the each parameter. This enables the avoidance of possible local minima at early stages of FWI iterations.

Once the FWI mono-parameter updates are completed for at least two parameters, the process can proceed to step 111. In step 111, it is determined whether the desired convergence is obtained. Step 111 can include defining convergence criteria for each parameter within each cascade.

In step 111, the desired convergence can be judged with a cost function based on the actual data used from the recorded data set 201 and the observed data. Cost function optimization methods involve computing the cost function for a population of models $\{M_1, M_2 \ldots M_n\}$ and selecting a set of one or more models from the population that approximately minimizes the cost function. For example, synthetic data generated from the geophysical property models resulting from steps 109a to 109n can be compared to the subset of observed data used in steps 109a to 109n according to a similar process described in FIG. 3, except that the gradient is now taken for all parameters at the same time. This cost function optimization technique is well known to those of ordinary skill in the art. If the result of step 111 is that the desired level of convergence is not obtained, another iteration of steps 109a to 109n are repeated. Steps 109a to 109n are repeated until the desired convergence is obtained.

Convergence refers to a condition that occurs during an iterative data modeling procedure when predictive output data, or a function measuring error (e.g., cost function), remains substantially the same between iterations. Convergence may be used to determine an end point for the iterative process by indicating an acceptable level of correspondence between predictive data with known data at a given point in space or time.

Once the desired level of convergence is obtained, the process proceeds to step 113. Step 113 can include defining global convergence criteria for the full data set. A global cost function optimization method, referenced above, can be used here as well.

The model analyzed in step 111 with respect to actual data used from the data set 200 can now be analyzed with respect to the entire data set 200. For example, synthetic data is generated from the models and is compared to observed data of the entire data set 200 according to a process that is similar to what is described in FIG. 3, except that the gradient is taken for all parameters at the same time. If a cost function based on this synthetic data and observed data has not converged, then the answer to step 113 is no and the process proceeds to step 115 in order for another cascade to be performed.

In step 115, the near offset region 203 and the far offset region 205 are expanded (i.e., the dashed vertical lines in FIG. 2 are systematically moved to II in the direction of the respective arrows) in order for each region to include more of the recorded data 201. Then steps 107 to 111 are repeated for this second cascade, which will use the expanded regions 203/205. Once convergence is achieved, the process will proceed again to step 113 in order to test for global convergence.

Cascades can be iteratively performed until the offset regions 203/205 are expanded from those used in a preceding cascade until each region 203/205 includes the full recorded wavefield data set 201 (i.e., until the offset regions 203/204 are systematically expanded to regions III and IV in respective iterative cascades). As shown in FIG. 2, at the time the answer to step 113 is yes, the full range of offsets can be utilized to update all inversion parameters. However, it is possible that convergence is deemed to have been satisfied before the offset regions 203/205 encompass the entire data set 203/205.

FIG. 2 divides the data set 201 in a manner that corresponds to four cascades before the offset regions 203/205 each encompass the entire data set 201. Four cascades is merely an example, and the data set 201 can be divided to correspond to any number of cascades.

Once global convergence is achieved, the answer to step 113 is yes and the process can proceed to step 117. The updated subsurface parameters that are obtained after step 113 are robust and consistent models that ensure a good fit to the recorded data at all offsets, and generates flattened image gathers (discussed below).

In step 117, hydrocarbons are managed according to the updated subsurface parameters. As used herein, hydrocarbon management includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Figure 4A:
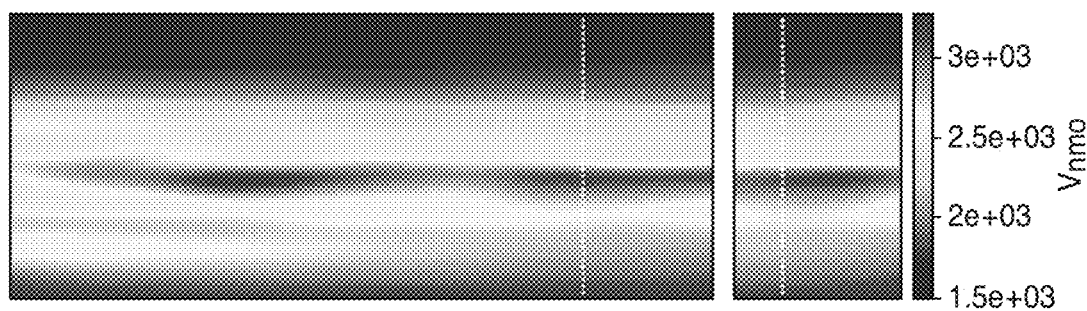
FIGS. 4A and 4B are non-limiting examples of models useable with the present technological advancement.
Figure 4B:
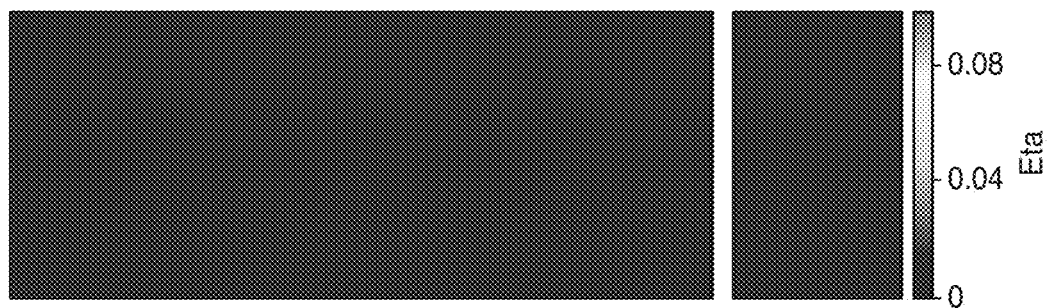

The following is an exemplary application of the present technological advancement to anisotropic acoustic inversion of a field 3D Narrow azimuth streamer data set. The maximum offset is approximately 5 km and the maximum (cut-off) frequency for the inversion is 15 Hz. The target area is approximately 4 km×12 km. A total of 20 FWI iterations are performed comprising four cascades (See FIG. 1). Each cascade is made up of 3 iterations for $V_{NMO}$ and 2 iterations for η. The initial models for $V_{NMO}$ and η are shown in FIGS. 4A and 4B, respectively. In FIGS. 4A and 4B, and in similar figure, the inline (left) and cross-line (right) panels are from positions indicated by the white broken lines on the opposite opposite panels. Note that whereas the initial $V_{NMO}$ model was derived from conventional ray-ray-base tomography, the starting η model was set to zero (consequently, FIG. 4B is entirely black).

Figure 5A:
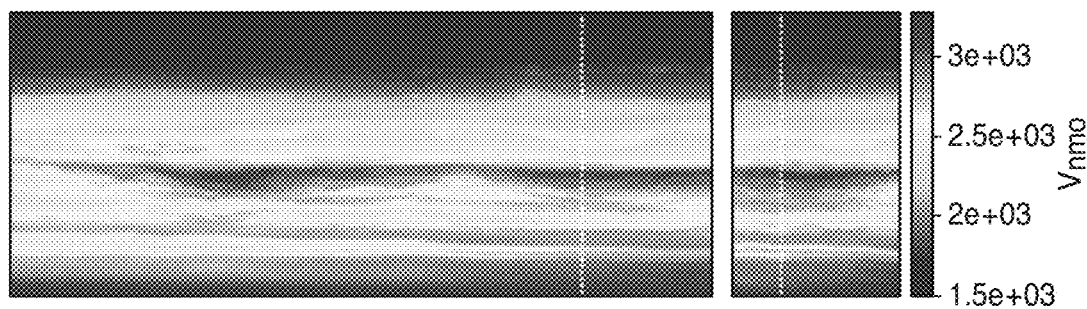
FIGS. 5A and 5B are non-limiting examples of inverted models derived from the present technological advancement.
Figure 5B:
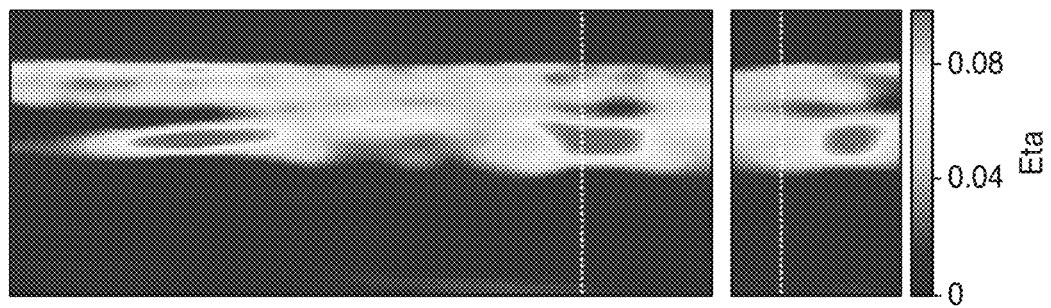

The inverted $V_{NMO}$ and η models are shown in FIGS. 5A and 5B, respectively. The estimated $V_{NMO}$ model (FIG. 5A) is of much higher resolution than the starting model (FIG. 4A) and the ηmodel (FIG. 5B) is geologic and of within known realistic values.

Figure 6A:
FIGS. 6A and 6B are non-limiting examples of pre-stack depth migration image gathers derived from using the models of FIGS. 3 and 4.
Figure 6B:
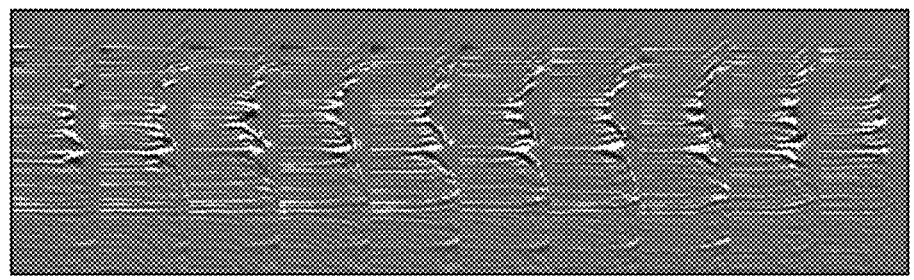

One measure of the accuracy of the estimated models is the flatness of the migrated image gathers. FIGS. 6A and 6B show the migrated gathers within the target area derived using the initial models (FIGS. 4A and 4B) and the inverted models derived using the present technological method (FIGS. 5A and 5B). Note that the gathers derived using the present technological advancement produce image gathers that are flatter at all offsets (FIG. 6B), indicating that these models are of superior quality to the starting models (FIG. 4A) derived from ray-based tomography.

While the above-embodiments described geophysical inversion based on cost function optimization, the present technological advancement can be used with other techniques, such as iterative series inversion. Iterative series inversion, based on iteration of the Lippmann-Schwinger equation is discussed in U.S. Pat. No. 8,121,823.

Figure 7:
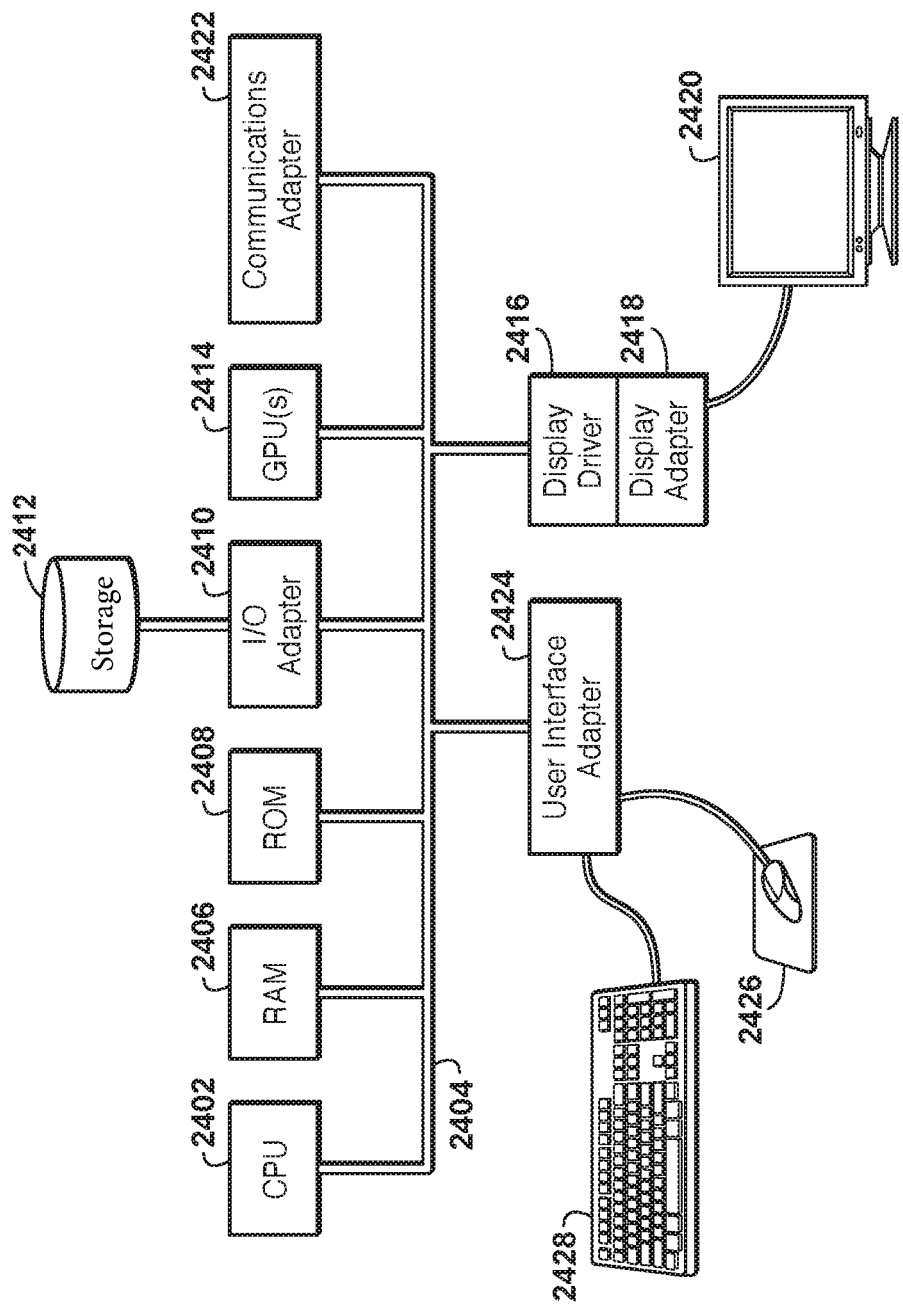
FIG. 7 is a non-limiting example of a computer that can execute methods that embody the present technological advancement.

FIG. 7 is a block diagram of a computer system 2400 that can be used to execute the present geophysical inversion techniques. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in 7, additional CPUs may be present. Moreover, the computer system 2400 may comprise a networked, multi-processor computer system that may include a hybrid parallel CPU/CPU system. The CPU 402 may execute the various logical instructions according to various teachings disclosed herein. For example, the CPU 2402 may execute machine-level instructions for performing processing according to the operational flow described.

The computer system 2400 may also include computer components s as non-transitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, a communications adapter 2422, a user interface adapter 2424, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with an the present techniques. Further, user interface adapter 2424 couples user input devices, such as a keyboard 2428, a pointing device 2426 and/or output devices to the computer system 400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits, Input data to the computer system 2400 may include various plug-ins and library files. Input data may additionally include configuration information.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

Each of the following references are hereby incorporated by reference in their entirety:
1. Bunks, C., F. M. Saleck, and S. Zaleski and G. Chavent (1995). Multiscale seismic waveform inversion: Geophysics, 60, 1457-1473.
2. Prieux, V., Operto, S., Brossier, R., and Virieux, J. (2009). Application of acoustic Full waveform inversion to the synthetic Valhall velocity model, SEG Expanded abstracts, 2268-2272.
3. Prieux, V., R. Brossier, Y. Gholami, S. Operto, J. Virieux, O. I. Barkved, and J. H. Kommedal (2011). On the footprint of anisotropy on isotropic full waveform inversion: The Valhall case study: Geophysical Journal International, 187, 1495-1515.
4. Sirgue, L., and Pratt, R. G. (2004). Efficient waveform inversion and imaging: A strategy for selecting temporal frequencies: Geophysics, 69, 231-248.
5. Warner, M., Ratcliffe, A., Nangoo, T., Morgan, J., Umpleby, A., Shah, N., Vinje, V., Štekl, I., Guasch, L., Win, C., Conroy, G., and Bertrand, A. (2013). "Anisotropic 3D full-waveform inversion." GEOPHYSICS, 78(2), R59-R80.

What is claimed is:
1. A method, comprising:
   obtaining initial estimates of a plurality of subsurface parameters, wherein the subsurface parameters comprise both anisotropic parameters and physical parameters;

obtaining a dataset representative of a wavefield from a seismic survey decomposed into a plurality of discrete offset ranges;

determining for each subsurface parameter a discrete offset range to which each subsurface parameter is most sensitive;

iteratively performing, with a computer, a cascaded inversion, wherein the iteratively performing the cascaded inversion includes:

iteratively updating, for each iteration of the cascaded inversion, each subsurface parameter;

expanding for each iteration of the cascaded inversion the plurality of discrete offset ranges to provide a plurality of expanded discrete offset ranges, wherein during each iteration of the cascaded inversion, an update to each iteratively updated subsurface parameter is constructed with the expanded discrete offset range that each iteratively updated subsurface parameter is sensitive to; and performing each iteration of the cascaded inversion until the plurality of expanded discrete offset ranges are each expanded to include all data within the dataset; and generating and displaying, with the computer, one or more subsurface models from the cascaded inversion for each of the subsurface parameters.

2. The method of claim 1, wherein each subsurface parameter is updated by performing a sub-iterative inversion process that comprises individually performing a predetermined number of mono-parameter full wavefield inversion updates for each subsurface parameter.

3. The method of claim 2, wherein the mono-parameter full wavefield inversion updates for each subsurface parameter are performed in series.

4. The method of claim 1, further comprising:

iteratively updating each subsurface parameter until a predetermined level of convergence between the dataset and the cascaded inversion for each subsurface parameter is achieved.

5. The method of claim 1, wherein the cascaded inversion is iteratively performed until a global convergence is obtained.

6. The method of claim 1, further comprising:

managing hydrocarbons based on the one or more subsurface models.

7. The method of claim 6, wherein the managing includes causing a well to be drilled at a location determined from the one or more subsurface models.

8. The method of claim 7, wherein the managing includes producing hydrocarbons from the well.

\* \* \* \* \*